(12) United States Patent
Leppänen et al.

(10) Patent No.: US 11,688,859 B2
(45) Date of Patent: Jun. 27, 2023

(54) VOLTAGE SOURCE WITH AN ELECTROLYTE CONTAINING ASH, AND METHOD FOR MANUFACTURING THE VOLTAGE SOURCE

(71) Applicant: Betolar Oy, Kannonkoski (FI)

(72) Inventors: Juha Leppänen, Kannonkoski (FI); Mirja Piispanen, Jokirinne (FI)

(73) Assignee: Betolar Oy, Kannonkoski (FI)

( * ) Notice: Subject to any disclaimer, the term of this patent is extended or adjusted under 35 U.S.C. 154(b) by 28 days.

(21) Appl. No.: 16/981,781

(22) PCT Filed: Mar. 13, 2019

(86) PCT No.: PCT/FI2019/050215
§ 371 (c)(1),
(2) Date: Sep. 17, 2020

(87) PCT Pub. No.: WO2019/180311
PCT Pub. Date: Sep. 26, 2019

(65) Prior Publication Data
US 2021/0119225 A1   Apr. 22, 2021

(30) Foreign Application Priority Data
Mar. 20, 2018   (FI) .................................. 20185261

(51) Int. Cl.
H01M 6/18     (2006.01)
H01M 50/562   (2021.01)
(Continued)

(52) U.S. Cl.
CPC ........... *H01M 6/185* (2013.01); *C04B 14/024* (2013.01); *C04B 28/021* (2013.01); *H01M 6/188* (2013.01);
(Continued)

(58) Field of Classification Search
CPC .. H01M 6/185; H01M 6/188; H01M 10/0562; H01M 10/058; H01M 50/562;
(Continued)

(56) References Cited

U.S. PATENT DOCUMENTS

| 4,130,627 A | 12/1978 | Russ et al. |
| 6,068,131 A | 5/2000 | Styron et al. |

(Continued)

FOREIGN PATENT DOCUMENTS

| CN | 107768712 A | * | 3/2018 | ........ H01M 10/0525 |
| JP | 2001-126752 A | | 5/2001 | |
| JP | 2015-082445 A | | 4/2015 | |

OTHER PUBLICATIONS

First Steps First Steps in Dein Devveloping Cement-Based eloping Cement-Based Batteries Batteries tto Po Powerower Cathodic PrCathodic Protection of Embedded otection of Embedded Steel in ConcrSteel in Concreteete Niall Holmes Technological University Dublin (Year: 2015).*

(Continued)

*Primary Examiner* — Niki Bakhtiari
*Assistant Examiner* — Bartholomew A Hornsby
(74) *Attorney, Agent, or Firm* — Merchant & Gould P.C.

(57) ABSTRACT

A voltage source includes two electrically conductive terminals (101, 102) with an electrolyte (103) between them. Said electrolyte (103) is a mixture in which the main component is ash produced in a power plant or an incineration plant.

8 Claims, 3 Drawing Sheets

Figure 1:
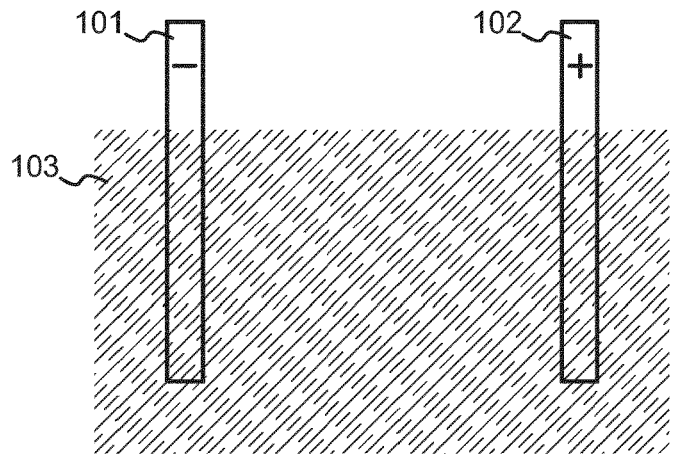

(51) Int. Cl.

| | |
|---|---|
| *H01M 10/0562* | (2010.01) |
| *H01M 10/058* | (2010.01) |
| *H01M 50/431* | (2021.01) |
| *H01M 50/55* | (2021.01) |
| *H01M 50/548* | (2021.01) |
| *H01M 50/434* | (2021.01) |
| *H01M 50/553* | (2021.01) |
| *H01M 50/403* | (2021.01) |
| *C04B 14/02* | (2006.01) |
| *C04B 28/02* | (2006.01) |
| *C04B 103/10* | (2006.01) |
| *C04B 111/00* | (2006.01) |
| *C04B 111/10* | (2006.01) |

(52) U.S. Cl.
CPC ..... *H01M 10/058* (2013.01); *H01M 10/0562* (2013.01); *H01M 50/403* (2021.01); *H01M 50/431* (2021.01); *H01M 50/434* (2021.01); *H01M 50/548* (2021.01); *H01M 50/55* (2021.01); *H01M 50/553* (2021.01); *H01M 50/562* (2021.01); *C04B 2103/10* (2013.01); *C04B 2111/00853* (2013.01); *C04B 2111/1087* (2013.01); *H01M 2220/10* (2013.01); *H01M 2300/0071* (2013.01)

(58) Field of Classification Search
CPC ..... H01M 2220/10; H01M 2300/0071; H01M 50/543; C04B 14/024; C04B 28/021; C04B 2103/10; C04B 2111/1087; C04B 2111/00853

See application file for complete search history.

(56) References Cited

U.S. PATENT DOCUMENTS

| | | | |
|---|---|---|---|
| 2012/0148924 A1 | 6/2012 | Ogino et al. | |
| 2018/0076478 A1* | 3/2018 | Mimura | ............ H01M 10/0563 |

OTHER PUBLICATIONS

Preparation and Characterization of Fly Ash/PVdF-PAN Composite Polymer Electrolyte Membranes and their Potential Use for Li-ion Batteries Rizqi Maulana (Year: 2016).*

Preparation and Characterization of Fly Ash/PVdF-PAN Composite Polymer Electrolyte Membranes and their Potential Use for Li-ion Batteries, International Journal of ChemTech Research vol. 9, No. 05 pp. 831-844 (Year: 2016).*

First Steps First Steps in Developing Cement-Based eloping Cement-Based Batteries to Power Cathodic Protection of Embedded Steel in Concrete, Technological University Dublin, 2015 (Year: 2015).*

International Search Report for corresponding International Patent Application No. PCT/FI2019/050215 dated Jul. 1, 2019, 3 pages.

Written Opinion of the International Searching Authority for corresponding International Patent Application No. PCT/FI2019/050215 dated Jul. 1, 2019, 8 pages.

Finnish Search Report for conesponding Finnish Patent Application No. 20185261 dated Sep. 12, 2018, 2 pages.

Allah R., A. et al., "Improve the Formation of Geopolymer Concrete Mixed with Seawater and Without Curing", American Journal of Civil Engineering, 5(6): 344-351 (2017).

Dr Simplehack, YouTube[online][video], 5 pages, .(2017), Internet: https://www.youtube.com/watch?v=obja4idm8bg.

Hanjitsuwan, S., et al., "Electrical conductivity and dielectric property of fly ash geopolymer pastes", International Journal of Minerals, Metallurgy and Materials, 18(1): 94-99 (2011).

Holmes, N. et al., "First Steps in Developing Cement-Based Batteries to Power Cathodic Protection of Embedded Steel in Concrete", Journal of Sustainable Design and Applied Research, 1-8 (2015).

Jiang, Z. et al., "Reaction behavior of Ai2O3 and SiO2 in high alumina coal fly ash during alkali hydrothermal process", Trans. Nonferrous Met. Soc. China, 25: 2065-2072 (2015).

Maulana, R. et al., "Preparation and Characterization of Fly Ash/PVdF-PAN Composite Polymer Electrolyte Membranes and their Potential Use for Li-ion Batteries", International Journal of ChemTech Research, 9(5): 831-844 (2016).

Ross, S. et al., "Lithium conductivity in glasses of the Li2O—Al2O3—SiO2 system", Phys. Chem. Chem. Phys., 17: 465-474 (2015).

Tang, L., "Rechargeable cement-based concrete batteries", 2 pages, (2017), retrieved from the internet: https://www.chalmers.se/en/projects/Pages/Rechargeable-cement-based-concrete-batteries.aspx.

* cited by examiner

US 11,688,859 B2

VOLTAGE SOURCE WITH AN ELECTROLYTE CONTAINING ASH, AND METHOD FOR MANUFACTURING THE VOLTAGE SOURCE

This application is a National Stage Application of PCT/FI2019/050215, filed 13 Mar. 2019, which claims benefit of Serial No. 20185261, filed 20 Mar. 2018 in Finland and which applications are incorporated herein by reference. To the extent appropriate, a claim of priority is made to each of the above disclosed applications.

TECHNICAL FIELD

The present description relates to utilization of industrial waste. Specifically, the description relates to a means to utilize ash produced in a power plant or an incineration plant in the production and/or storage of electrical energy.

BACKGROUND

Ash produced in a power plant or an incineration plant is a mixture containing oxides of various substances in concentrations depending on what has been burnt in the power plant or the incineration plant. Frequent terms used include fly ash which is differentiated from bottom ash. Fly ash is very fine and, as the name suggests, it is separated from flue gases produced in a boiler, the flue gases carrying it from the combustion chamber to a flue gas treatment unit. Bottom ash is collected from the bottom of the combustion chamber.

Ash constitutes a significant global waste problem, because it is produced in large amounts, and it may contain for example heavy metals due to which ash may not be applied as such for example to forests as a fertilizer. Due to its fineness, fly ash is also difficult to handle, because the dust spreads easily and may thus cause exposure to detrimental particulates.

SUMMARY

An objective of the present invention is to disclose the use of ash such that it may be utilized in an easy and safe way. Another objective of the invention is to disclose a new way to generate and/or store electricity.

The objectives of the invention are achieved by using ash produced in a power plant or an incineration plant as an electrolyte in a voltage source which forms a primary or a secondary battery and which may at the same time be a part of built environment.

The voltage source according to the invention is characterized by features set forth in the characterizing part of the accompanying independent claim relating to a voltage source.

The invention also relates to a method characterized by features set forth in the characterizing part of the accompanying independent claim relating to a method.

The dependent claims disclose preferred embodiments of the invention.

LIST OF FIGURES

Figure 2:
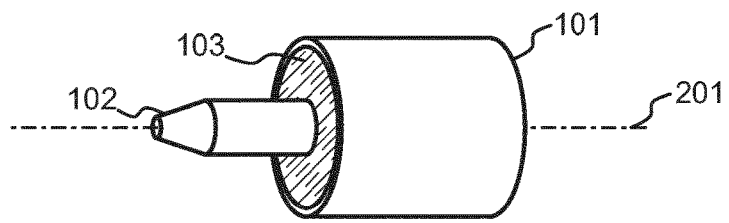
Figure 3:
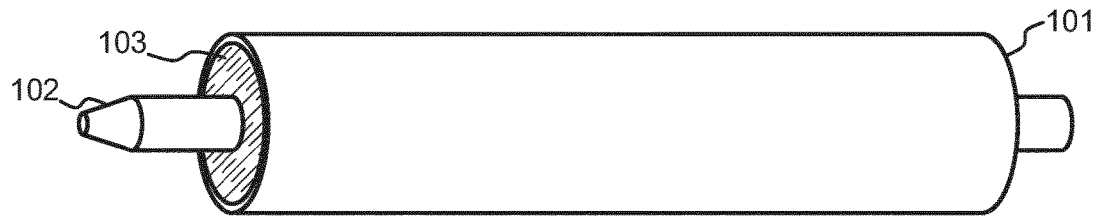
Figure 4:
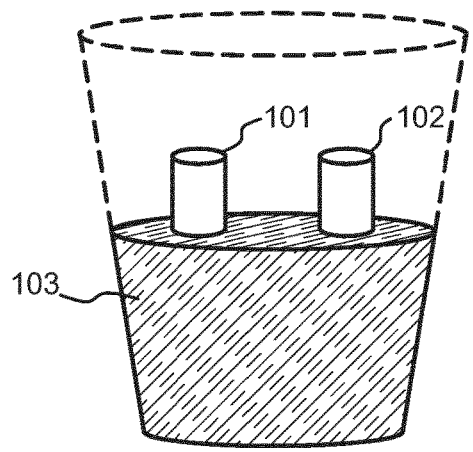
Figure 5:
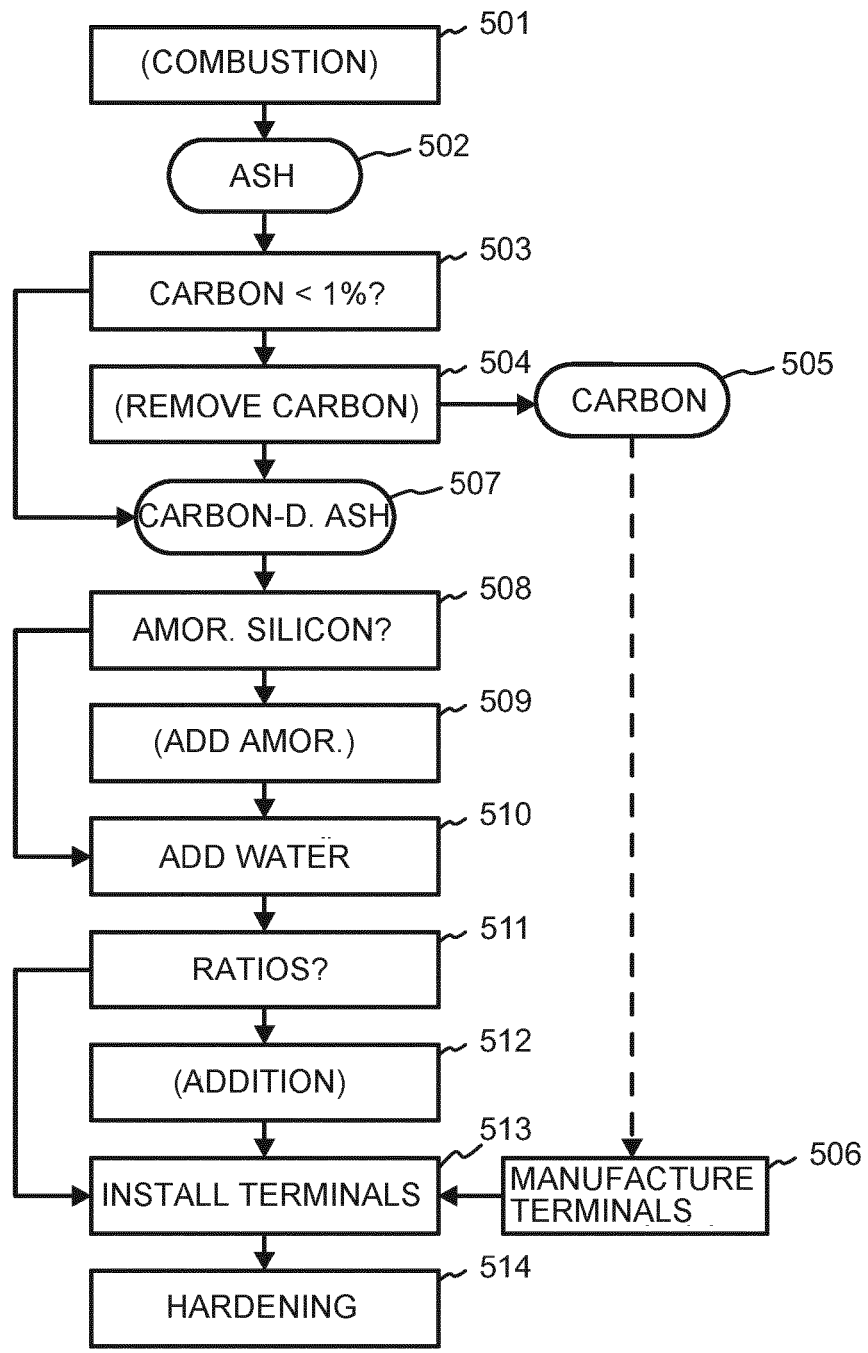
Figure 6:
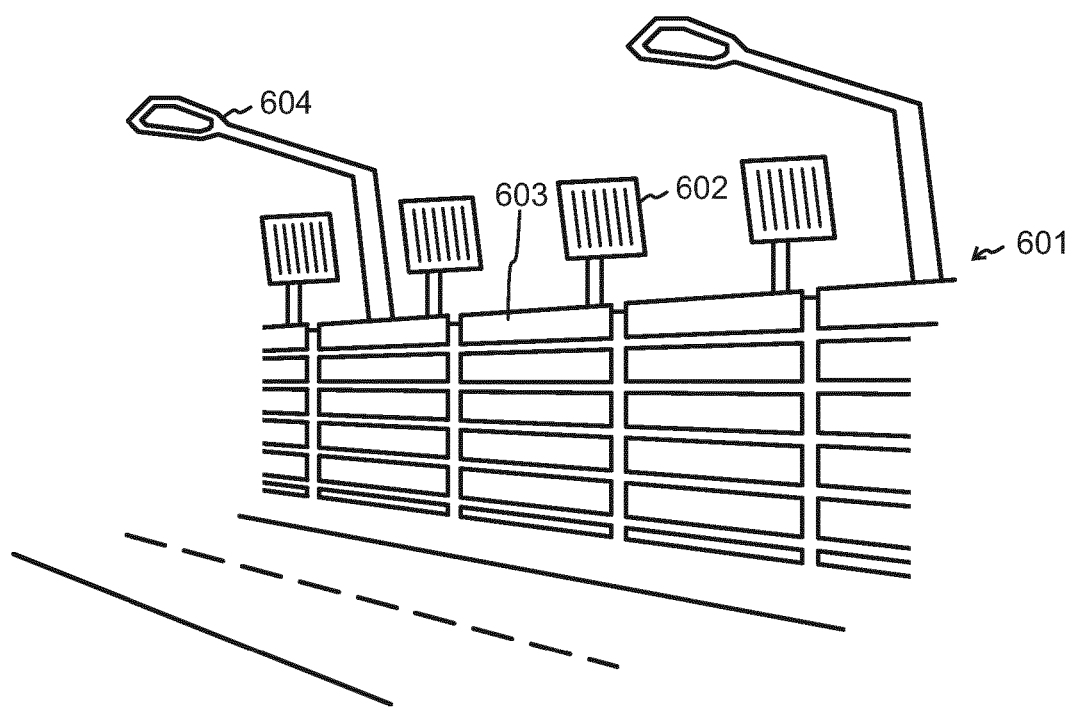

The invention and its embodiments will now be described in more detail with reference to the accompanying figures, in which FIG. 1 illustrates the principle of a simple voltage source,
FIG. 2 shows one voltage source manufactured as a prototype,
FIG. 3 shows one voltage source manufactured as a prototype,
FIG. 4 shows one voltage source manufactured as a prototype,
FIG. 5 illustrates one method for manufacturing the voltage source, and
FIG. 6 illustrates one voltage source that is also a part of built environment.

Like parts are indicated with the same reference numerals in the figures.

DETAILED DESCRIPTION

FIG. 1 shows a voltage source including a first terminal or first electrode 101 and a second terminal or second electrode 102 with an electrolyte 103 between them. Terminals 101 and 102 are made from a material having good electrical conductivity such as metal or carbon. The electrolyte 103 is a mixture in which the main component is ash produced in a power plant or an incineration plant. By main component it is meant that the proportion of said ash, in percent by weight, in the electrolyte 103 is greater than the proportion of any other component used for its manufacture.

The ash used to manufacture the electrolyte 103 may be fly ash, bottom ash, or their mixture. In terms of the invention it is an essential observation that ash contains plenty of ionizable compounds, especially aluminium and silicon oxides. Terminals 101 and 102 and the electrolyte 103 jointly form an electrochemical cell that may be used, under some conditions, either as a primary battery or as a secondary battery, i.e. a rechargeable battery. These conditions will be discussed in more detail below.

Ash recovered from a power plant or an incineration plant is, as such, dry and dusty, so its applicability as the electrolyte may preferably be improved by mixing for example water with the ash. According to one embodiment the electrolyte 103 is a paste in which the main components are said ash and water. The amount of water mixed with the ash is not essential, and may be selected so as to obtain good processability for the mixture. In the research relating to the invention a mixture in which 6 grams of water were mixed with 20 grams of fly ash was used as an example, but according to tests the amount of water may vary for example between three and twelve grams per 20 grams of ash.

In the research relating to the invention it was observed that because ash recovered from a power plant or an incineration plant contains such high amounts of aluminium and silicon oxides, it is relatively simple to harden it into a solid material. According to one embodiment the electrolyte 103 is solid material formed by allowing aluminium and silicon oxides in said ash to react with each other, so that following this reaction the electrolyte hardens to a solid form. This type of reaction may be provided as simply as by mixing water with the ash.

However, it is very common that ash recovered from a power plant or an incineration plant contains so much carbon that a mere mixing of water with it will not start the above-described reaction. Carbon reacts more actively with aluminium than silicon, so it competes with the silicon and to a substantial extent prevents the hardening reaction, if the carbon content in ash is too high. In the research relating to the invention it was observed that the content of carbon in ash may not be more than about one percent by weight, if the hardening reaction is to be provided. Thus, according to one embodiment the electrolyte 103 is solid material formed by reducing the carbon content in ash produced in a power plant or an incineration plant, and by mixing water with the resulting carbon-depleted ash.

Further, it has been observed that the higher the proportion of amorphous silicon in the silicon, the more it is advantageous for the above-described hardening reaction. The proportion of amorphous silicon in the silicon contained in the ash depends on the combustion temperature. In simple terms, the higher the temperature prevailing in the combustion chamber of the power plant or the incineration plant, the higher is the proportion of amorphous silicon in the silicon contained in the ash. In the combustion of coal the temperature is high, so ash recovered from a coal-fired power plant is preferred for the hardening reaction. If the proportion of amorphous silicon in the recovered ash is not sufficient as such, amorphous silicon may be added to the ash for the manufacture of the electrolyte 103, or different types of ash may be mixed so that the proportion of amorphous silicon rises to a sufficient level.

Additionally or instead, an additional activator may be added to the ash, which activator may be an acid or a base and by the effect of which also crystalline silicon can be rendered sufficiently reactive for the electrolyte 103 to be able to harden into solid material. This type of additional activator may, at least in some embodiments, be understood as meaning an alkaline activator. Examples of alkaline activators may be lye, hydroxides, e.g. sodium hydroxide (NaOH), potassium hydroxide (KOH), lithium hydroxide (LiOH), or all of their mixtures and combinations. The alkaline activator may comprise or be an aqueous hydroxide solution. The additional activator may, at least in some embodiments, be understood as meaning sodium sulphate (Na2SO4), sodium carbonate (Na2CO3), potassium sulphate (K2SO4), potassium carbonate (K2CO3), or all of their mixtures and combinations.

If the first terminal 101 and the second terminal 102 illustrated schematically in FIG. 1 are different materials, the resulting voltage source is a so-called voltaic cell, and it is arranged to operate at least as a primary battery. The voltage that appears between terminals 101 and 102 depends on the position of the terminal materials in the electropotential series of metals. In the research relating to the invention, for example aluminium was tested as the material for the first terminal 101 and graphite chalk for the second terminal 102. In this type of voltage source the second terminal 102 is about 1.5 volts more positive than the first terminal 101.

In the research relating to the invention it was observed that a voltage source in which the terminals are different materials can be charged by connecting the terminals to a current source with a voltage higher than the spontaneous voltage electrochemically appearing between the terminals. In the research relating to the invention, two voltage sources were charged, both with the first terminal 101 made of aluminium. The second terminal 102 was either graphite chalk or steel. With a charging voltage of 30 volts the value of charging current was initially about 1 ampere, but decreased within a few minutes so as to settle to a level of slightly below 0.5 ampere. Charging was continued for some minutes, after which the charging current source was removed, and voltage between the terminals of the voltage source was measured. Directly after charging the voltage was about 2.5 volts, and even after 12 hours it was about 2 volts.

If the first terminal 101 and the second terminal 102 illustrated schematically in FIG. 1 are the same material, there will be no electrochemically spontaneous voltage between the terminals. However, in this case the voltage source may be arranged to operate as a secondary, i.e. rechargeable, battery. In the research relating to the invention, a voltage source with both terminals made of graphite chalk was charged at a voltage of 30 volts. The measurement results for the charging were comparable to the above-described results relating to voltage sources as a primary battery.

FIGS. 2, 3 and 4 illustrate some small proto-types manufactured for the purposes of the research relating to the invention. In FIG. 2 the voltage source is generally shaped as a cylinder, and an electrolyte 103 is located inside an aluminium tube operating as a first terminal 101. A rod-shaped graphite chalk operating as a second terminal 102 is concentrically positioned in the aluminium tube, such that the assembly is axially symmetrical relative to axis 201. The outer diameter of the aluminium tube is about 25 mm, its wall thickness is about 2 mm and its length is about 30 mm. The thickness of the graphite chalk is about 8 mm. The prototype shown in FIG. 3 differs from that shown in FIG. 2 in terms of its length only. Measurements for the voltage sources illustrated in FIGS. 2 and 3 were compared, and it was found that the voltage appearing between terminals 101 and 102 does not depend on the size, but only on the materials of the voltage source. In the embodiment shown in FIG. 4 an electrolyte 103 was placed in a cup made from electrically insulating paperboard, and graphite chalks as described above were used as terminals 101 and 102.

FIG. 5 illustrates some steps of a method that may be used for manufacturing the voltage source described above. A preparatory step 501 includes combustion of waste or other energy source in a power plant or an incineration plant so as to obtain ash 502. In step 503 the carbon content of ash is detected. If it is higher than about 1 percent by weight, in step 504 the carbon content of ash is reduced by a chemical, electrical and/or specific-weight-based method, so that the carbon content of the ash is decreased to a value of no more than one percent by weight of the ash. Removed carbon 505 may be recovered and it may be used for manufacturing the terminals as represented by step 506.

In step 510, water is added to carbon-depleted ash 507. It should be noted that the removal of carbon (step 504) can be performed before or after adding water, depending on the method used for removing the carbon. Before this, the proportion of amorphous silicon may be analyzed in step 508, and if it is detected to be too low, the proportion of amorphous silicon may be increased or an additional activator may be added to ash in step 509.

In the research relating to the invention it was observed that in order to provide the hardening reaction and to provide the hardened solid electrolyte with a compression strength that is as high as possible, the weight ratio $SiO_2:Al_2O_3$ may be about 10:1-about 1:2. Increasing the relative amount of $SiO_2$ may increase the compression strength of the hardened material obtained by means of the binder composition. Increasing the relative amount of $Al_2O_3$ may, on the other hand, increase the tensile strength and/or thermal resistance of the hardened material obtained by means of the binder composition. In a well-suited binder composition the weight ratio $SiO_2:Al_2O_3$ may be for example about 5:1-about 1:1 or about 4:1-about 2:1.

For this purpose, in the method illustrated in FIG. 5 the ratio of aluminium to silicon in the electrolyte may be analyzed in step 511. If it is detected to be far from the optimum, the method may include step 512 of adding silicon oxide and/or aluminium oxide obtained from another source to the electrolyte. By such addition of silicon and/or aluminium oxide, the ratio between aluminium and silicon contents in said electrolyte is transferred closer to one to three, expressed as molar concentration. Steps 511 and 512, if applied, may also be carried out before adding water in step 510, for example while analyzing the proportion of amorphous silicon in step 508.

Step 513 represents installation of the terminals in their place in the electrolyte. Installation of the terminals as such may already be carried out much before this, for example so that the terminals are disposed in their place in the mould in which the electrolyte will be cast after mixing with water (step 510). FIG. 5 also includes step 514 in which the electrolyte hardens and reaches the required structural strength. This step is not necessary in applications in which the electrolyte does not need to be hardened.

In terms of the hardening reaction, water has no other purpose than to start the reaction. When the hardening reaction has started, water may be removed from the electrolyte, if necessary, for example by evaporating. If needed, the evaporation of water may be accelerated by heating, for example by subjecting the electrolyte to infrared or microwave radiation, or even by conducting electrical current through the electrolyte, as it is electrically conductive to some degree.

As to electrical connections, the voltage sources described above may be used as any voltage source, i.e. they may be connected in parallel and series in various configurations so as to achieve desired current delivery capacity and output voltage.

One special characteristic of ash recovered from a power plant or an incineration plant compared to most other materials is its low price. As ash has commonly been considered waste, the price may even be negative, which means that the operator of a power plant or an incineration plant may be willing to pay other parties for receiving the ash while committing to take care of it according to waste treatment regulations. The part of the terminals in the total structure of the voltage source is small, and if necessary, they may be manufactured from the carbon separated from ash in order to reduce the carbon content in the ash to a sufficiently low level for providing the hardening reaction.

Due to the low raw material costs of the voltage source, the voltage source may be built very large and/or they can be manufactured in very large quantities at a very affordable price. This affordability compensates for the fact that the voltage source does not match the traditional rechargeable and single-use batteries in terms of performance. It is even possible to build the voltage source so large that it also becomes a part of built environment. Built environment refers to the ensemble of all artificially created, fixed, physical structures for improving people's standard of living, comfort and operating conditions.

The parts of built environment that the voltage source as described above may form include for example buildings, parts of buildings, furniture, fences, railings, barriers, towers, terraces, bridges, roads and environmental art.

The voltage source may be or it may be formed for example into an element. The element may be for example a building element, such as a wall element, a hollow-core slab element, a façade element, a column element or a beam element; or an infrastructure element, such as a road or a street construction element, a bridge element, a railing element, a retaining wall element, an edge beam, a tunnel element, a railroad tie, a pier element, an agricultural element or a foundation element. The voltage source may also be or it may be formed for example into a balcony, a road structure, a base, a mine protection barrier, a foundation, a noise wall, a post, a container, a yard slab, or a cable trough.

The invention can be used to build for example a noise barrier 601 as shown in FIG. 6, with solar panels 602 attached to it in order to generate an electric current for charging the noise barrier itself; the noise barrier's own physical structure may thus function as a solar panel battery, when the voltage sources as described above are used as components in it. As illustrated in FIG. 6, these components may be for example horizontal elements 603 with embedded terminals connected to each other and to a suitable charge and discharge control circuit to provide desired electrical properties. The terminals and the control circuit as such are not illustrated in FIG. 6. Electrical energy stored in the noise barrier may be conducted, during a dark season, for example to lights 604 that illuminate the same drive way that is separated from a residential area by the noise barrier 601.

The above-described embodiments of the invention are not limiting in terms of the scope of protection of the following claims; instead their basic idea may be modified in many ways without departing from the scope of protection of the claims. For example, carbon may not only be removed from, but also added to ash. Although excessive carbon content in ash is disadvantageous in embodiments where the electrolyte is to be hardened, it is in no way detrimental but may even be beneficial in cases where the electrolyte does not need to be hardened. Carbon may improve the electrical conductivity of the electrolyte, which may be a well-founded reason for adding it. For the same purpose, also other substances affecting the electrical conductivity, such as chlorides or other easily ionizable compounds, may be added to the electrolyte in various stages of the manufacturing method, if desired. One simple way to add chlorides to the electrolyte is to use seawater as the water added to ash for forming the electrolyte.

The invention claimed is:

1. A voltage source including two electrically conductive electrodes with an electrolyte between them, wherein:
   said electrolyte is a mixture in which the main component is ash produced in a power plant or an incineration plant, and
   at least one of said electrically conductive electrodes is made of a graphite chalk.

2. The voltage source according to claim 1, wherein said electrolyte is a paste comprising said ash and water.

3. The voltage source according to claim 1, wherein said electrolyte is solid material formed by allowing aluminium and silicon oxides in said ash to react with each other, so that following this reaction the electrolyte hardens to a solid form.

4. The voltage source according to claim 3, wherein said electrolyte is solid material formed by reducing the carbon content in ash produced in a power plant or an incineration plant, and by mixing water with the resulting carbon-depleted ash.

5. The voltage source according to claim 3, wherein said electrolyte contains at least one of the following: amorphous silicon added to said ash or additional activator added to said ash.

6. The voltage source according to claim 1, wherein said electrodes are different materials, wherein the voltage source is configured to operate at least as a primary battery.

7. The voltage source according to claim 1, wherein said electrodes are the same material, wherein the voltage source is configured to operate as a rechargeable battery.

8. The voltage source according to claim 1, wherein the voltage source forms at least one of the following: a building, a part of a building, furniture, a fence, a railing, a barrier, a tower, a terrace, a bridge, a road, environmental art, a wall element, a hollow-core slab element, a façade element, a column element, a beam element, a road or a street construction element, a bridge element, a railing element, a retaining wall element, an edge beam, a tunnel element, a railroad tie, a pier element, an agricultural element, a foundation element, a balcony, a road structure, a base, a mine protection barrier, a foundation, a noise wall, a post, a container, a yard slab, or a cable trough.

* * * * *